United States Patent [19]
Takahashi et al.

[11] Patent Number: 5,713,625
[45] Date of Patent: Feb. 3, 1998

[54] BODY STRUCTURE OF MOTORCAR

[75] Inventors: Akio Takahashi; Takeshi Koiwa, both of Wako, Japan

[73] Assignee: Honda Giken Kogyo Kabushiki Kaisha, Tokyo, Japan

[21] Appl. No.: 537,617

[22] Filed: Oct. 2, 1995

[30] Foreign Application Priority Data

Oct. 17, 1994 [JP] Japan ................... 6-275492

[51] Int. Cl.$^6$ ................................. B60R 27/00
[52] U.S. Cl. ................................. 296/194; 296/188
[58] Field of Search .................. 296/188, 193, 296/194, 197, 203, 204, 205, 29, 30, 189; 293/132

[56] References Cited

U.S. PATENT DOCUMENTS 4,822,096  4/1989  Fujii ............................. 296/194
5,125,715  6/1992  Kijima ....................... 296/194 X
5,562,329  10/1996 Srock et al. ............... 296/194 X

FOREIGN PATENT DOCUMENTS 59-142179  9/1984  Japan.

*Primary Examiner*—Joseph D. Pape
*Attorney, Agent, or Firm*—Armstrong, Westerman, Hattori, McLeland & Naughton

[57] ABSTRACT

In a body structure of a motorcar having a connecting member between a front side-frame and a floor frame bending from upper front toward lower rear underneath a dashboard, the connecting portion is efficiently reinforced. The body structure includes the connecting member opening upwardly, a gusset opening downwardly and attached to an upper surface of the connecting member to form a closed section together with the connecting member, and an upper surface of the gusset assuming a curved line extending smoothly from the front side-frame to the floor frame as viewed from a lateral side.

12 Claims, 3 Drawing Sheets

BODY STRUCTURE OF MOTORCAR

BACKGROUND OF THE INVENTION

The present invention relates to a body structure of a motorcar and more particularly, to a structure of a connecting portion between a front side-frame and a floor frame underneath of a dashboard.

In motorcars, a front side-frame is provided in a engine room in front of a dashboard at left and right sides of the motorcar and a floor frame is provided underneath a passenger room behind the dashboard. The front side-frame and floor frame are connected to each other below the dashboard. The connecting portion is shaped so that it bends from an upper front side of the front side-frame towards a lower rear side of the floor frame. Therefore, when a large external force acts on the front side-frame and is translated to the floor frame, for example, the connecting portion tends to buckle.

Accordingly, hitherto, the connecting portion has been provided with a reinforcing means. For example, in a body front structure of a motorcar shown in Japanese Laid-Open Utility Model Publication No. Sho 59-142 179, at a rear end portion of a front side-frame having a closed section, a connecting portion of open section is formed which extends along a dashboard from a stand-up surface of the dashboard to an under surface of the dashboard. A reinforcing plate is fixed to the connecting portion extending from upper opening edges of the connecting portion to a bottom wall of the front side-frame. At a central portion of the reinforcing plate, a depressed bead is formed which is joined to a bottom wall of the connecting portion.

A customary reinforcing member of the connecting portion is provided within the connecting portion, at a length along the connecting portion, to act as a reinforcing plate. The bent shape of the connecting portion causes a large stress concentration to occur at the bent portion thus, making it difficult to sufficiently prevent buckling of the connecting portion.

In order to reinforce a portion on which stresses are concentrated, measures such as increasing plate thickness of the frame body and adding a bulkhead are required. However, these measures result in a large increase in the weight of the structure.

SUMMARY OF THE INVENTION

The present invention is accomplished in view of the above-mentioned circumstances and provides a body structure of a motorcar having a connecting member between a front side-frame and a floor frame. The connecting member bends from an upper front thereof towards a lower rear thereof, underneath of a dashboard. The connecting member opens upwardly and a gusset opens downwardly to be attached to an upper surface of the connecting member to form a closed section together with the connecting member. An upper surface of the gusset assumes a curved line extending smoothly from the front side-frame to the floor frame as viewed from a lateral side.

According to the present invention, when the connecting member tends to buckle because of a large external force applied to the front side-frame from the front thereof, the gusset withstands this force to prevent an abrupt buckling of the connecting member and the whole frame is bent gently to efficiently transmit the input force from the front side-frame to the floor frame through the connecting member and the gusset.

Since the gusset upper surface assumes a smooth curved line which decreases sharp bending of the connecting member, the degree of the stress concentration is mitigated so that it is unnecessary to increase plate thickness of the frame or to add a bulkhead and thus, the weight is reduced.

DETAILED DESCRIPTION OF THE PREFERRED EMBODIMENT

Figure 1:
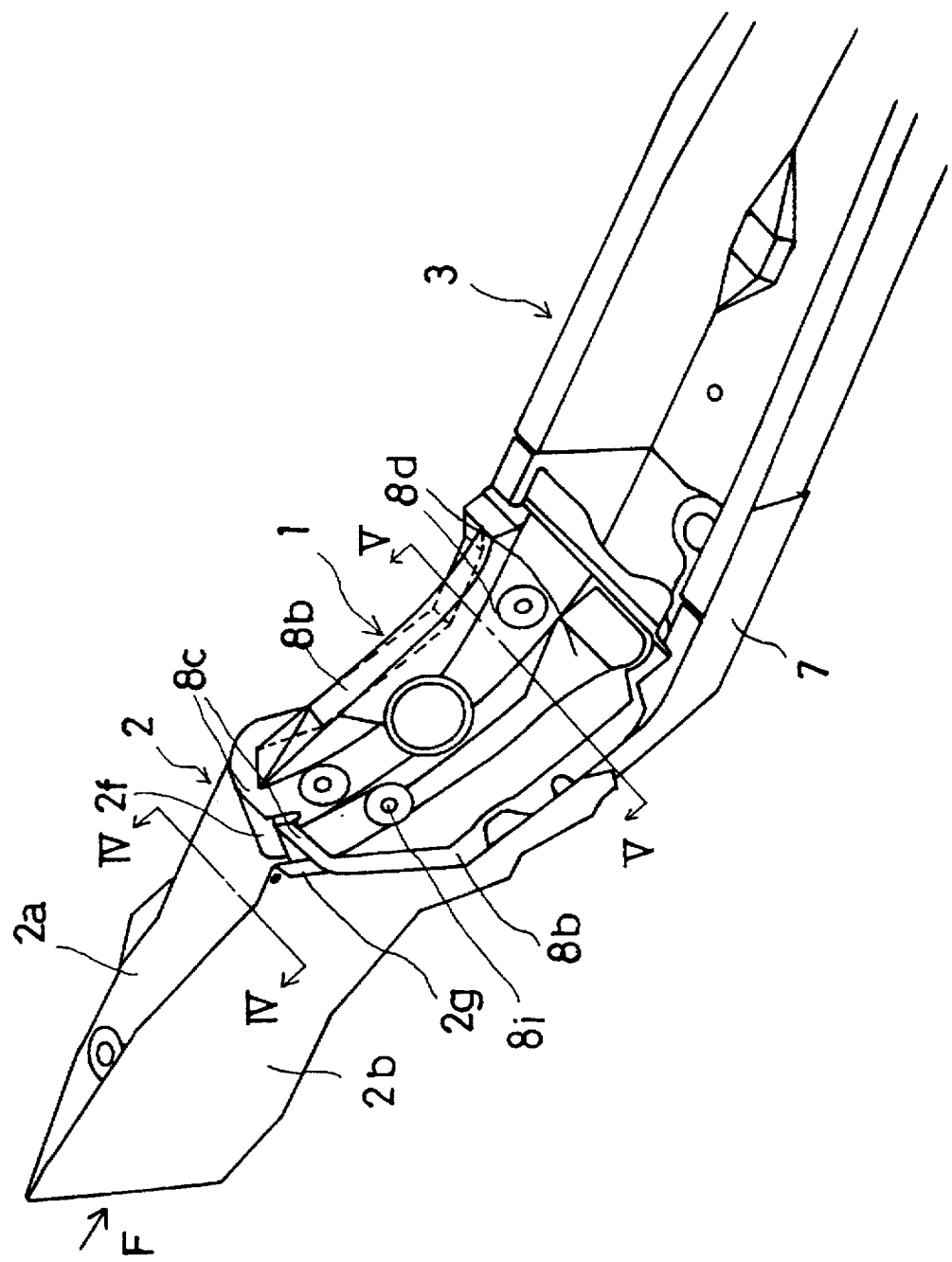
FIG. 1 is a top, rear and left-side perspective view of a front side-frame and a floor frame connected through a connecting member according to the present invention.
Figure 2:
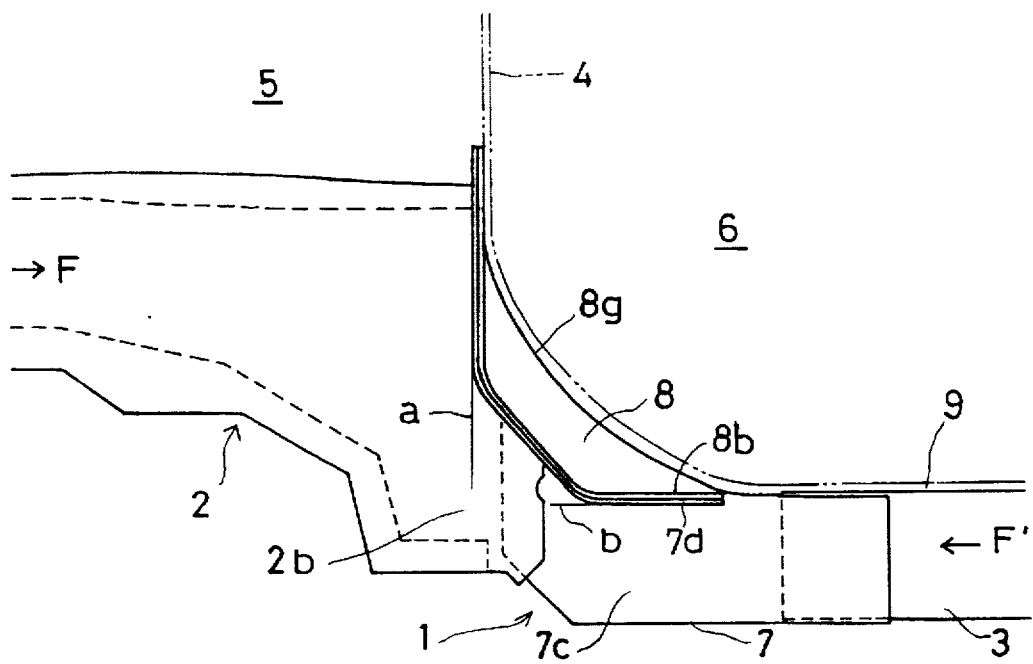
FIG. 2 is a cross-sectional side view of the front side-frame, floor-frame and connecting member shown in FIG. 1.

Hereinafter, the present invention will be described with reference to an illustrated preferred embodiment. FIG. 1 is a perspective view showing a front side-frame 2 and a floor frame 3 connected through a connecting portion 1 according to the present invention and FIG. 2 is a cross-section side view thereof.

As is well known, the front side-frame 2 is provided on each of left and right sides of an engine room 5. The engine room 5 is located in front of a dashboard 4. The floor frame 3 is located on each of left and right sides under a passenger room 6 behind the dashboard 4. On each of left and right sides, the front side-frame 2 and the floor frame 3 are connected to each other below the dashboard via the connecting portion 1.

Figure 4:
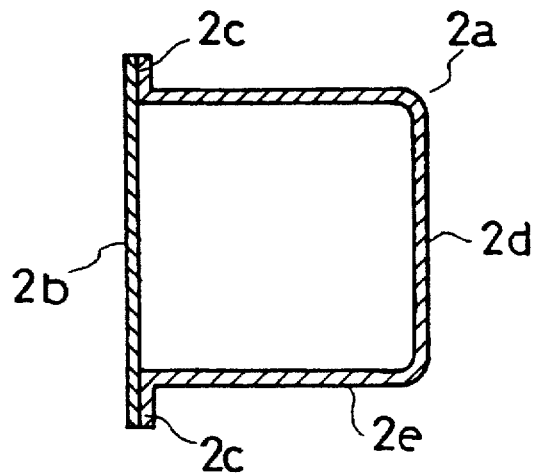
FIG. 4 is a cross-sectional view taken along the line IV—IV of FIG. 1.

The front side-frame 2 includes a front side-frame main body 2a arranged on the outer side of the width of the car (right upper side in FIG. 1). The front side-frame main body 2a opens toward the inner side of the width of the car to form a U-shaped section. The front sideframe 2 also includes a flat closing plate 2b, closing the opening of the frame main body 2a, to form a closed cross-sectional shape as shown in FIG. 4. The symbol 2c in FIG. 4 denotes flanges which project along upper and lower edges of the opening of the front side-frame main body 2a. Upper and lower edges of the closing plate 2b are abutted against the flanges 2c and fixed thereto by spot welding or similar to form the closed cross-sectional shape of the front sideframe 2.

Figure 5:
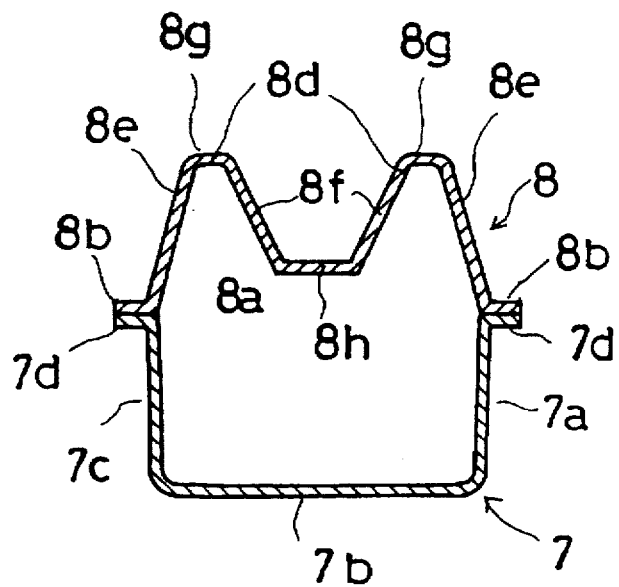
FIG. 5 is a cross-sectional view taken along the line V—V of FIG. 1.

The front side-frame 2, having the closed section, extends in front and rear directions within the engine room 5 and an opened rear end face of the front side-frame 2 is abutted against the dashboard 4. At a lower portion of the rear end face, a connecting member 7 is integrally formed to be connected to the floor frame 3. The connecting member 7 extends rearwardly and passes below the dashboard 4. As shown in FIG. 5, the connecting member 7 has a U-shaped cross-section which opens upwardly. The connecting member 7 also has an outer side wall part 7a and a bottom wall part 7b which are integral and continuous with a side wall part 2d and a bottom wall part 2e of the front side-frame main body 2a (FIG. 4).

A lower part at the rear end of the closing plate 2b extends as far as a front portion of the inner side wall part 7c of the connecting member 7 (FIG. 2). The lower part contacts the outer surface of the front portion in a side-by-side manner and is fixed thereto.

A front end of the floor frame 3 is fitted to a rear end of the connecting member 7 extending from the front side-frame 2. The front end of the floor frame 3 has a similar U-shaped cross-section which opens upwardly and is fixed by a suitable fixing means. Thus, the front side-frame 2 and the floor frame 3 are connected to each other through the connecting portion 1. The front side-frame 2 is positioned relatively high and the floor frame 3 is positioned relatively low. Therefore, the connecting member 7 between the front side-frame 2 and the floor frame 3 is inevitably shaped so as to be bent from a high front portion toward a low rear portion as shown in FIG. 2.

When an external force F is applied to the front side-frame 2 from a front of the front side-frame 2 towards a rear of the front side-frame 2, the force F is transmitted to and received by the floor frame 3 through the connecting member 7, and the connecting member 7 is subjected to the force F from the front, as well as a reaction force F' from the rear. Since lines of action of the forces F, F' are separated from each other in an up and down direction, these forces F, F' act on the connecting member 7 as a couple. As a result, the connecting member 7, which is bent as mentioned above, is apt to cause a buckling deformation in the direction that the degree of bending is furthest increased. To cope with this, a gusset 8 is provided on the connecting portion 1, between the front side-frame 2 and the floor frame 3, to reinforce the connecting member 7.

The gusset 8 has a box-shaped cross-section with an open face 8a on one side as shown in FIG. 5. The gusset 8 is attached to the upper surface of the connecting member 7 with flanges 8b projecting outwardly along both side edges of the open face 8a abutted against flanges 7d which project from upper edges of both side wall parts 7a, 7c of the connecting member 7. Thus, a closed section is formed together with the connecting member 7.

As shown in FIG. 2, the flanges 7d, 8b are gradually bent upwardly, forwardly of the gusset, in accordance with the bent shape of the connecting member 7. In response to this, the opening direction of the open face 8a also is gradually changed from a downward direction to an obliquely forward direction. The open face 8a opens forwardly precisely at the front end of the gusset 8 and the open face at the front end is surrounded from an upper edge thereof to both side edges by a flange 8c and continuing to the flanges 8b at both side edges thereof. The flange 8c is abutted against and fixed to flanges 2f, 2g which are formed by bending rear end edges of the frame main body 2a and closing plate 2b of the front side-frame 2.

In such a manner, the gusset 8 is fixed between the front side-frame 2 and the connecting member 7 with the open face 8a opposed to the opening faces of the front side-frame 2 and the connecting member 7. On a wall portion of the gusset 8 covering the open faces 8a from the side which the passenger room 6 is on, a pair of right and left projections or projected strip portions 8d are formed which further project toward the side which the passenger room 6 is on and extending in front and rear directions.

Figure 3:
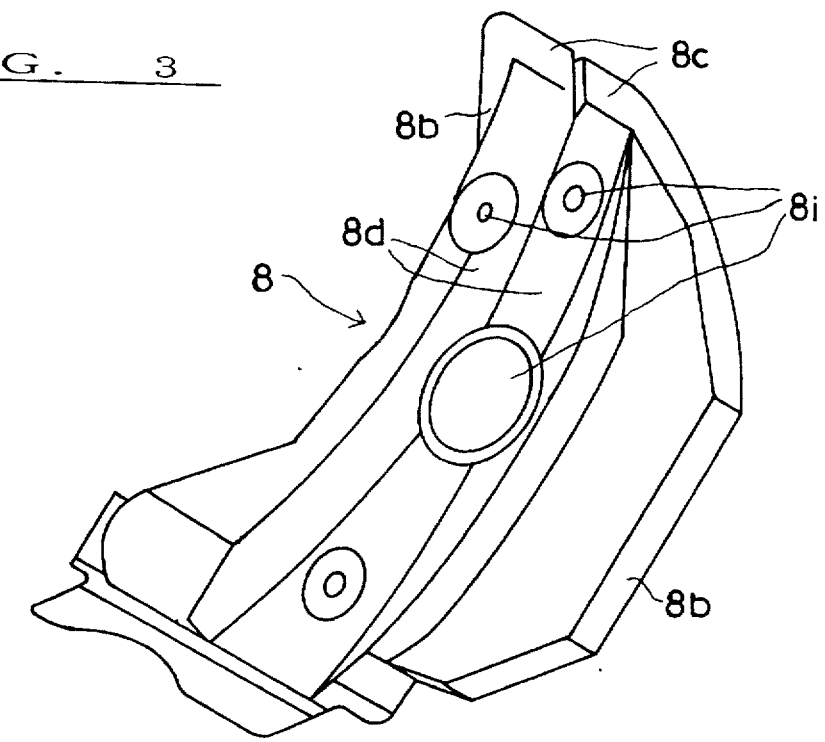
FIG. 3 is a top, rear and right-side perspective view of the gusset of FIG. 1.

As understood from FIGS. 1, 3 and 5, the projected strip portion 8d is composed of an outside face 8e rising from a flange 8b on a corresponding side thereof, an inside face 8f opposing the outside face 8e and an upper face 8g connecting the upper edges of the outside and inside faces 8e, 8f. Lower edges of both inside faces 8f are connected by a low bottom wall portion 8h.

The upper faces of both projected strip portions 8d extend along nearly the same curved surfaces. When the upper faces are viewed from the lateral side, as shown in FIG. 2, they assume an arc-shaped curved line which descends smoothly from the front end upper portion of the gusset 8 to the rear end thereof contacting the upper surface of the connecting member 7. A floor panel 9 extends forwardly along the upper faces of both projected strip portions 8d of the gusset 8 and joins the dashboard 4.

In FIGS. 1 and 3, the symbol 8i denotes an opening or a hole which is suitably provided in the gusset 8 as occasion demands.

The gusset 8 connects the vertical rear end surface a of the front side-frame 2 and the horizontal upper surface h of the connecting member 7 like a diagonal and supports the rear end surface a from the rear as shown in FIG. 2, so that the gusset 8 efficiently opposes the buckling deformation of the connecting member 7 caused by the above-mentioned external force F and therefore, no abrupt buckling occurs in the connecting member 7.

Since the width of the gusset 8 is equal to the width of the connecting member 7 and the closed section is formed by the gusset 8 and the connecting member 7, an input force from the front side-frame 2 is efficiently transmitted to the floor frame 3 through the connecting member 7 and the gusset 8.

In addition, since the upper faces 8g of the gusset 8 assume a smooth shape as viewed from the lateral side so as to reduce abrupt bending at the connecting portion 1, the degree of stress concentration is mitigated and it is unnecessary to increase plate thickness of the frame or to add a bulkhead. Thus, the weight is reduced.

The present invention is not limited to the above described preferred embodiment. For example, though in the above embodiment the gusset 8 has a pair of right and left projected strip portions 8d, the gusset 8 may be formed in a simple box-shape having no projected portion, but the upper surface still assumes a smooth curved line as viewed from a lateral side.

What is claimed is:

1. A body structure of a motorcar comprising:
   a front side-frame;
   a floor frame;
   a connecting means for connecting said front side-frame to said floor frame in order to transmit a force applied to said front side-frame to said floor frame which in turn applies a reaction force to said connecting means tending to buckle said connecting means, wherein said connecting means bends underneath a dashboard of said motorcar from an upper front position of said motorcar toward a lower rear position of said motorcar and wherein said connecting means has a somewhat U-shaped cross-section which opens upwardly, towards a ceiling of said motorcar; and
   a gusset means for reinforcing said connecting means from buckling, wherein said gusset means has a somewhat M-shaped cross-section which opens downwardly towards a floor of said motorcar, said gusset means is attached to an upper surface of said connecting means to form a closed section together with said connecting means and said gusset means has a pair of inner and outer upper faces such that an outline of any one of said inner and outer upper faces forms a curved line extending smoothly from said front side-frame to said floor frame as viewed from a lateral side.

2. The body structure of a motorcar as claimed in claim 1, wherein a width of said gusset is equal to a width of said connecting member.

3. The body structure of a motorcar as claimed in claim 1, wherein said front side-frame has a main body which includes a side wall part, a top wall part and a bottom wall part such that said top and bottom wall parts have outwardly extending flanges.

4. The body structure of a motorcar as claimed in claim 3, wherein said front side-frame further includes a closing plate connectable to said flanges of said top and bottom wall parts to close a sideways U-shaped cross-section of said front side-frame.

5. The body structure of a motorcar as claimed in claim 1, wherein said somewhat U-shaped cross-section of said connecting means has two side wall parts with each side wall part having an outwardly projecting flange.

6. The body structure of a motorcar as claimed in claim 5, wherein said somewhat M-shaped cross-section of said gusset means has inner and outer outside faces such that said outside faces have flanges projecting outwardly therefrom.

7. The body structure of a motorcar as claimed in claim 6, wherein said flanges of said connecting means are connectable to said flanges of said gusset means in order to form a closed cross-section.

8. The body structure of a motorcar as claimed in claim 1, wherein said gusset means having said somewhat M-shaped cross-section is defined by two outside faces approximately slanted from vertical and two oppositely slanting inside faces, said outside faces integrally connected to said inside faces by two approximately horizontal upper faces and said two inner faces integrally connected by an approximately vertical low bottom wall portion.

9. The body structure of a motorcar as claimed in claim 8, wherein any one of said upper faces of said gusset means has a hole therein.

10. The body structure of a motorcar as claimed in claim 8, wherein one of said outside faces, one of said upper faces and one of said inside faces form a projection from said low bottom wall portion of said gusset means.

11. The body structure of a motorcar as claimed in claim 1, wherein said curved line extending smoothly from said front side-frame to said floor frame as viewed from a lateral side forms an arc.

12. The body structure of a motorcar as claimed in claim 1, wherein a portion of said front side-frame overlaps a first portion of said connecting means and a second portion of said connecting means overlaps a portion of said floor frame.

* * * * *